United States Patent
Oh et al.

(10) Patent No.: US 9,813,114 B2
(45) Date of Patent: Nov. 7, 2017

(54) SHEET FOR SHIELDING ELECTROMAGNETIC WAVES FOR WIRELESS CHARGING ELEMENT

(71) Applicant: SAMSUNG ELECTRO-MECHANICS CO., LTD., Suwon-si, Gyeonggi-do (KR)

(72) Inventors: Seung Hee Oh, Suwon-si (KR); Doo Ho Park, Suwon-si (KR); Jung Young Cho, Suwon-si (KR); Jong Ho Chung, Suwon-si (KR); Jung Wook Seo, Suwon-si (KR); Sung Yeol Park, Suwon-si (KR); Sung Nam Cho, Suwon-si (KR); Seung Min Lee, Suwon-si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 15/141,074

(22) Filed: Apr. 28, 2016

(65) Prior Publication Data

US 2016/0345474 A1 Nov. 24, 2016

(30) Foreign Application Priority Data

May 22, 2015 (KR) .................. 10-2015-0072175
Aug. 12, 2015 (KR) .................. 10-2015-0113827
Jan. 29, 2016 (KR) .................. 10-2016-0011708

(51) Int. Cl.
*H04B 5/00* (2006.01)
*H02J 7/02* (2016.01)
*H02J 50/10* (2016.01)

(52) U.S. Cl.
CPC ......... *H04B 5/0025* (2013.01); *H04B 5/0031* (2013.01); *H04B 5/0037* (2013.01); *H02J 7/025* (2013.01); *H02J 50/10* (2016.02)

(58) Field of Classification Search
None
See application file for complete search history.

(56) References Cited

U.S. PATENT DOCUMENTS

| | | | | |
|---|---|---|---|---|
| 3,760,257 A | * | 9/1973 | Fletcher | H01L 31/04 136/244 |
| 2006/0202882 A1 | * | 9/2006 | Noda | H05K 9/0083 342/1 |

(Continued)

FOREIGN PATENT DOCUMENTS

| | | |
|---|---|---|
| KR | 10-2009-0113418 A | 11/2009 |
| KR | 10-2014-0062730 A | 5/2014 |

(Continued)

OTHER PUBLICATIONS

Korean Office Action dated May 30, 2016, issued in Korean patent application No. 10-2016-0004899. (w/ English translation).

(Continued)

*Primary Examiner* — Kevin Bernatz
(74) *Attorney, Agent, or Firm* — McDermott Will & Emery LLP

(57) ABSTRACT

A sheet for shielding electromagnetic waves includes a magnetic sheet formed of a metal ribbon. The magnetic sheet includes fractures disposed in a plurality of cracked portions comprising a plurality of metal ribbon fragments.

25 Claims, 10 Drawing Sheets

(56) References Cited

U.S. PATENT DOCUMENTS

| | | | | |
|---|---|---|---|---|
| 2006/0251203 A1* | 11/2006 | Okamura | ............... | B32B 15/04 |
| | | | | 376/287 |
| 2008/0117509 A1* | 5/2008 | Hayashi | ............... | G02B 5/3058 |
| | | | | 359/485.05 |
| 2008/0317620 A1* | 12/2008 | Suzuki | ..................... | B22F 3/26 |
| | | | | 419/19 |
| 2009/0120681 A1* | 5/2009 | Matsuzaki | .............. | H01F 17/06 |
| | | | | 174/350 |
| 2009/0267558 A1 | 10/2009 | Jung | | |
| 2010/0230154 A1* | 9/2010 | Naito | .................... | B41M 3/006 |
| | | | | 174/389 |
| 2012/0247868 A1* | 10/2012 | Kato | .................... | H05K 9/0084 |
| | | | | 181/284 |
| 2014/0134401 A1* | 5/2014 | Park | ....................... | H01F 1/375 |
| | | | | 428/155 |
| 2016/0055952 A1 | 2/2016 | Watanabe et al. | | |
| 2016/0345471 A1* | 11/2016 | Cho | ....................... | H02J 50/12 |
| 2016/0345472 A1* | 11/2016 | Park | ....................... | H02J 7/025 |

FOREIGN PATENT DOCUMENTS

| | | |
|---|---|---|
| KR | 10-1411480 B1 | 6/2014 |
| KR | 10-2015-0001416 A | 1/2015 |
| KR | 10-2015-0050541 A | 5/2015 |
| WO | 2014/157526 A1 | 10/2014 |

OTHER PUBLICATIONS

Korean Office Action dated Oct. 26, 2016 issued in Korean patent application No. 10-2016-0004899. (w/ English translation).

\* cited by examiner

SHEET FOR SHIELDING ELECTROMAGNETIC WAVES FOR WIRELESS CHARGING ELEMENT

CROSS-REFERENCE TO RELATED APPLICATION

This application claims the benefit of Korean Patent Applications Nos. 10-2015-0072175, 10-2015-0113827, and 10-2016-0011708, respectively filed on May 22, 2015, Aug. 12, 2015, and Jan. 29, 2016, with the Korean Intellectual Property Office, the disclosures of which are incorporated herein by reference.

BACKGROUND

The present invention relates to a magnetic sheet, a method of manufacturing a magnetic sheet, and a wireless communications device.

Along with reductions in weight and size of portable electronic devices, the electronic devices are increasingly being configured for non-contact type charging. The non-contact type charging relies on a wireless power charging scheme for operation. The wireless power charging scheme uses magnetic coupling (or inductive coupling) for charging of a battery of the electronic device without requiring the connection of physical electrical contact(s).

The wireless power charging scheme is a scheme in which charging is performed through the use of electromagnetic induction. In general, a primary coil (a transmitting coil) is provided in a charger (a wireless power transmitting device), a secondary coil (a receiving coil) is provided in a charging target (a wireless power receiving device), and a current is generated in the secondary coil according to inductive coupling between the primary coil and the secondary coil to provide energy used to charge a battery of the charging target.

In accordance with this disclosure, a magnetic sheet performing a shielding function is disposed between the receiving coil and the battery. The shielding sheet serves to shield the battery from a magnetic field generated by the receiving coil and allow electromagnetic waves generated by the wireless power transmitting device to be effectively transmitted to the wireless power receiving device.

Such a magnetic sheet is processed as a film and applied as is, or, in regard to reducing eddy current loss, a technique of fracturing a magnetic sheet and additionally processing the fractured magnetic sheet into a plurality of fragments to be used has been proposed. In the process of fracturing a magnetic sheet, a method of pressing one surface of the magnetic sheet has generally been used, and accordingly, fragments P having random shapes and arrangements are formed in the magnetic sheet 30 as illustrated in FIG. 1.

SUMMARY

An aspect of the present disclosure may provide a sheet for shielding electromagnetic waves for a wireless charging apparatus, capable of securing reproducibility of shielding performance and enhancing charge efficiency.

According to an aspect of the present disclosure, a sheet for shielding electromagnetic waves may include a magnetic sheet formed of a metal ribbon. The magnetic sheet includes fractures disposed in a plurality of cracked portions comprising a plurality of metal ribbon fragments.

According to another aspect of the present invention, a sheet for shielding electromagnetic waves may include a magnetic sheet formed of a metal ribbon. The magnetic sheet may include fractures disposed in a plurality of cracked portions extending as a solid structure having a pyramidal shape or a conical shape from one surface of the magnetic sheet.

According to a further aspect of the disclosure, a sheet for shielding electromagnetic waves may include a magnetic sheet formed of a metal ribbon. The magnetic sheet may include a plurality of cracked portions having a solid structure protruding from one surface of the magnetic sheet, and the cracked portions may be arranged at regular intervals on the one surface of the magnetic sheet.

According to a further aspect of the disclosure, a sheet for shielding electromagnetic waves may include a magnetic sheet formed of a metal ribbon. The magnetic sheet may include fractures disposed in a plurality of cracked portions. The plurality of cracked portions may be regularly formed, and a spacing between adjacent cracked portions ranges from 50 μm to 1500 μm.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
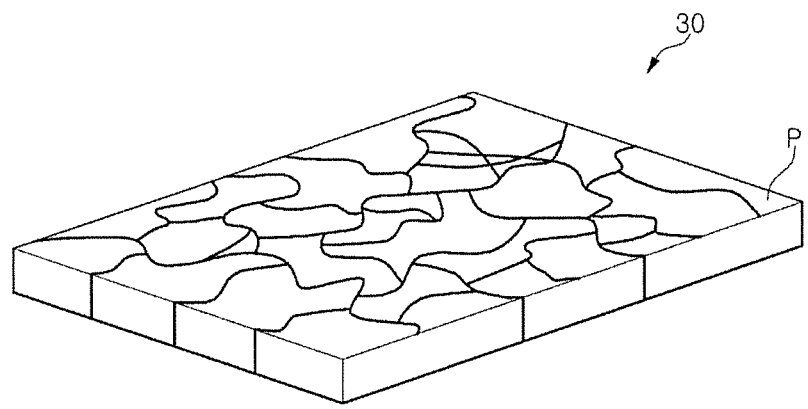
FIG. 1 is a perspective view schematically illustrating a configuration of a magnetic sheet generally used in the related art.

Hereinafter, embodiments of the present inventive concept will be described as follows with reference to the attached drawings.

The present inventive concept may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region, or wafer (substrate) is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another member, component, region, layer or section. Thus, a first member, component, region, layer or section discussed below could be termed a second member, component, region, layer or section without departing from the teachings of the example embodiments.

Spatially relative terms, such as "above," "upper," "below," and "lower" and the like, may be used herein for ease of description to describe one element's relationship to another element(s) in the illustrative orientation shown in the figures. It will be understood that the spatially relative terms are intended to encompass different orientations of the device in use or operation in addition to the orientation depicted in the figures. For example, if the device in the figures is turned over, elements or features described as "above" or "upper" relative to other elements would then be oriented "below" or "lower" relative to the other elements or features. Thus, the term "above" can encompass both the above and below orientations depending on a particular direction of the figures or depicted device(s)/element(s). The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments of the present inventive concept. In the drawings, regions and components are shown having ideal shapes. However, due to manufacturing techniques and/or tolerances, modifications of the shapes shown may be expected. Thus, embodiments of the present inventive concept should not be construed as being limited to the particular shapes of regions shown in the figures, but should instead be construed as including changes in shape resulting from manufacturing processes, for example. The following embodiments may also be constituted by one or a combination thereof.

The present inventive concept may take the form described below, but the inventive concept should more generally be interpreted as including a variety of other configurations derived from the illustrative configuration described herein.

A magnetic sheet according to an example embodiment in the present disclosure is used for shielding electromagnetic waves in apparatuses for wireless charging, near-field communication, electronic payment, and the like, and has a structure formed of a metal ribbon. The magnetic sheet includes a cracked portion including a plurality of metal ribbon fragments formed by fracturing the magnetic sheet. The cracked portion has a solid structure protruding from one surface of the magnetic sheet.

Hereinafter, a configuration and an operational effect of the present inventive concept will be described in detail with reference to the accompanying drawings.

Figure 2:
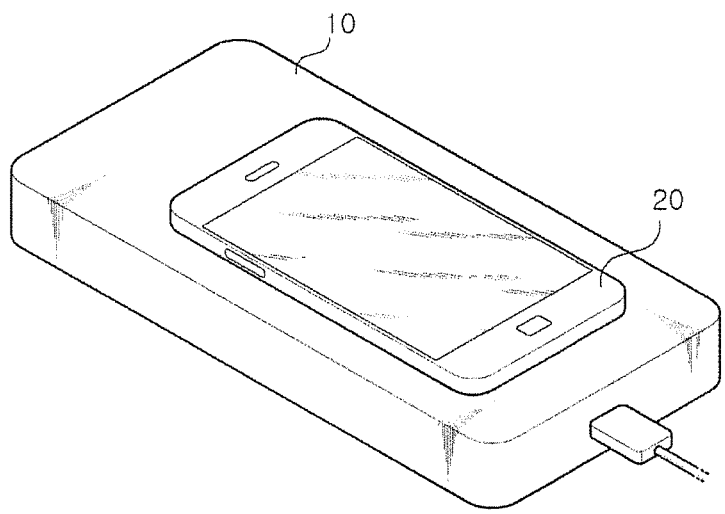
FIG. 2 is a schematic perspective view of a general wireless charging system.
Figure 3:
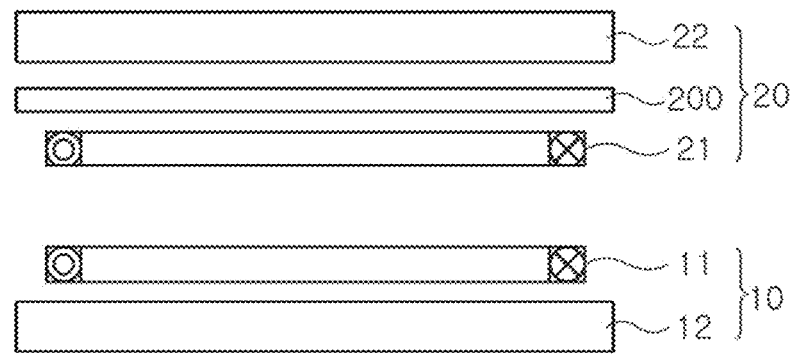
FIG. 3 is an exploded cross-sectional view illustrating major internal components of FIG. 2.

FIG. 2 is a schematic perspective view of a general wireless charging system used in mobile phones, or the like, and FIG. 3 is an exploded cross-sectional view illustrating major internal components of FIG. 2.

Referring to FIGS. 2 and 3, the general wireless charging system may include a wireless power transmitting device 10 and a wireless power receiving device 20.

The wireless power transmitting device 10 is a device generating a magnetic field therearound for charging a wireless power receiving device 20 disposed within its vicinity. The wireless power receiving device 20 is a device charged with power derived from the magnetic field in an inductive coupling manner. The wireless power receiving unit 20 may be one of various types of electronic devices, such as a mobile phone, a laptop computer, or a tablet PC.

In an interior of the wireless power transmitting device 10, a transmitting coil 11 is disposed on a substrate 12. When an alternating current (AC) voltage is applied to the wireless power transmitting device 10, a magnetic field is formed around the transmitting coil 11. Accordingly, current and/or electromotive force is induced in a receiving coil 21 that is inductively coupled to the transmitting coil 11, such as a receiving coil 21 installed in a wireless power receiving device 20 disposed on (or in the vicinity of) the wireless power transmitting device 10. The induced current and/or electromotive force can be used to charge a battery 22 of the wireless power receiving device 20.

The battery 22 may be a nickel metal hydrogen battery or a lithium ion battery into which electricity may be charged or from which electricity may be discharged, but is not limited thereto. Also, the battery 22 may be configured to be separated from the wireless power receiving device 20 and detachably attached to the wireless power receiving device 20, or may be formed integrally with the wireless power receiving device 20.

The transmitting coil 11 and the receiving coil 21 may be electromagnetically coupled when the wireless power receiving device 20 is located on (or in the vicinity of) the wireless power transmitting device 10. Each of the transmitting coil 11 and the receiving coil 21 may be formed by winding metal wire such as copper. In this case, the metal wire may be wound in a circular, oval, quadrangular, or a diamond shape, and an overall size or the number of windings may be appropriately controlled to be set according to required characteristics.

A sheet 200 for shielding an electromagnetic wave for a wireless charging apparatus may be disposed, e.g. within the wireless power receiving device 20, between the receiving coil 21 and the battery 22. The sheet 200 for shielding electromagnetic waves (hereinafter referred to as an "electromagnetic wave blocking sheet 200") for a wireless charging apparatus may be positioned between the receiving coil 21 and the battery 22 to block a magnetic field generated by the receiving coil 21 from reaching the battery 22.

Meanwhile, in the present example embodiment, a configuration in which a magnetic sheet is applied to a wireless charging device is described, but the magnetic sheet may also be applied to any other type of wireless communications device. In detail, a magnetic sheet having a structure described hereinafter may be included in a near-field communication (NFC) apparatus or an electronic payment (MST) apparatus, and in addition, the magnetic sheet may also be applied to a single device integrating these apparatuses. In this case, the wireless charging device, the NFC device, and the electronic payment device may be provided in the form of a plurality of functional regions separated within a coil unit included in a wireless communications device.

Figure 4:
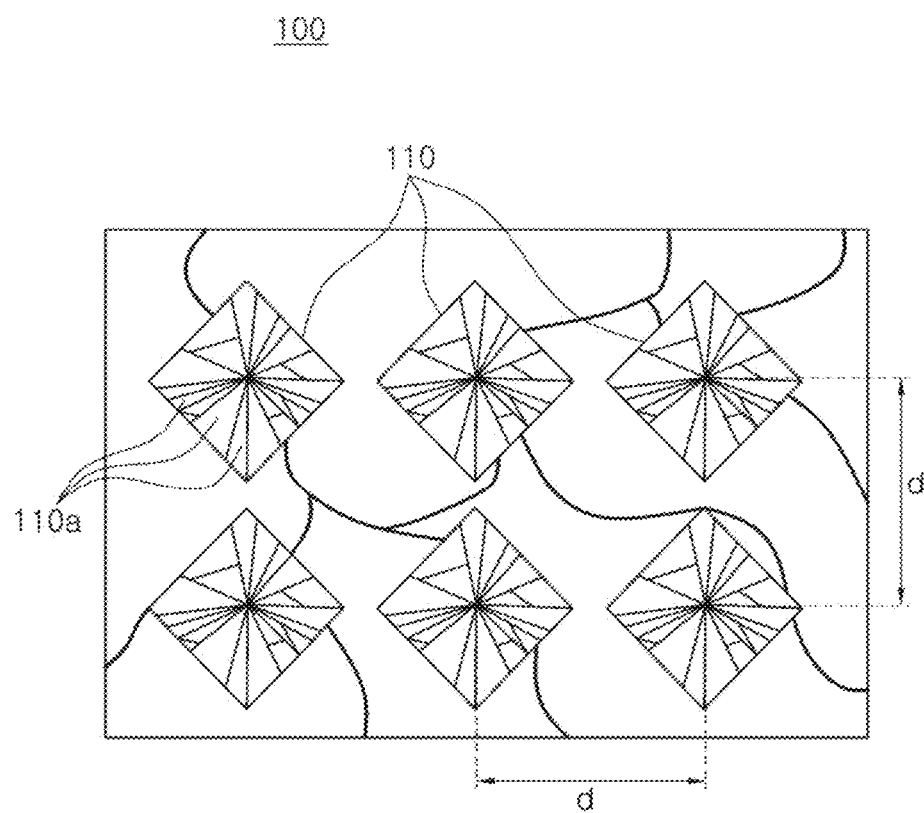
FIG. 4 is a plan view illustrating a magnetic sheet of a sheet for shielding electromagnetic waves for a wireless charging apparatus according to an example embodiment in the present disclosure.

FIG. 4 is a plan view illustrating a magnetic sheet of a sheet for shielding electromagnetic waves for a wireless charging apparatus according to an example embodiment in the present disclosure.

The electromagnetic wave blocking sheet 200 for a wireless charging apparatus, as shown in FIG. 3, includes one or more magnetic sheets 100 according to an example embodiment. The magnetic sheets 100 may be provided as metal ribbons, and each magnetic sheet 100 is fractured to form fractures in each of a plurality of cracked portions 110. For example, the electromagnetic wave blocking sheet 200 may include multiple magnetic sheets 100 that are overlaid, stacked, and/or disposed adjacently (e.g., edge-to-edge) to form the blocking sheet 200.

The magnetic sheet 100 may be formed of or include a thin metal ribbon formed of an amorphous alloy or a nanocrystal grain alloy. The magnetic sheet 100 may be formed of a material having soft magnetic or ferromagnetic characteristics, such that the magnetic sheet 100 itself has soft magnetic or ferromagnetic characteristics. The metal ribbon used in the magnetic sheet 100 is formed of or includes a magnetic material having high magnetic permeability, and whose magnetic permeability value is changed according to a degree of fracturing of the ribbon.

As an amorphous alloy, an Fe-based or Co-based magnetic alloy may be used. The Fe-based magnetic alloy may be, for example, an Fe—Si—B alloy. As the content of a metal including Fe is increased in the alloy, a saturation magnetic flux density of the alloy may be increased, but an excess of Fe makes it difficult to become amorphous. Thus, the content of Fe may range from 70 to 90 atomic %, and a preferred amorphous forming ability of the alloy may be obtained when the sum of contents of silicon (Si) and boron (B) ranges from 10 to 30 atomic %. With respect to the basic composition of the amorphous alloy, a corrosion-resistant element such as chromium (Cr) or cobalt (Co) may be added in an amount of 20 atomic % to prevent corrosion, or a small amount of other metal elements may be added as necessary in order to provide other characteristics.

As a nanocrystalline alloy, an Fe-based nanocrystalline magnetic alloy may be used. As the Fe-based nanocrystalline magnetic alloy, an Fe—Si—B—Cu—Nb alloy may be used.

The magnetic sheet 100 formed as a metal ribbon may be fractured to form a plurality of cracked portions 110, as shown in FIG. 4. In the example shown in FIG. 4, the plurality of cracked portions 110 are formed to be disposed at regular (or even) intervals or a regular (or even) spacing on one surface of the magnetic sheet 100 and to have a consistent shape. In one example illustrated in FIG. 4, the cracked portions 110 are formed to each have a solid structure having a regular (or same, or consistent) shape (e.g., a shape having a square outline, as shown in FIG. 4) and such that the plurality of solid structures are arranged at regular intervals (or a regular/even spacing) on the magnetic sheet 100. In the illustrated example, the solid structures are arranged regularly such that, for example, a spacing d between the cracked portions 110 are uniform or the plurality of cracked portions 110 are arranged regularly. The orientation of the solid structures may also be maintained to be the same on the magnetic sheet 100, as shown in FIG. 4. Further, the solid structures may be formed by metal ribbon fragments that are disposed in planes other than the plane of the one surface of the magnetic sheet 100 in each of the cracked portions 110.

Magnetic characteristics (for example, magnetic permeability or core loss) of the magnetic sheet 100 are changed due to structural factors such as a shape of fractured cracks, a size of fragments, or a shape of fragments. The magnetic characteristics are major variables affecting charging efficiency when wireless charging is performed. In order to optimize charging efficiency, it can be desirable that magnetic characteristics such as magnetic permeability be freely adjusted. As such, fracturing of the metal ribbon magnetic sheet 100 can be used and adjusted to achieve particular magnetic characteristics.

In contrast, in devices of the related art, generally, an irregularly randomly fractured magnetic sheet is used as illustrated in FIG. 1. The irregularly randomly fractured magnetic sheet has a limitation in that magnetic characteristics of the magnetic sheet are difficult to adjust so as to optimize charging efficiency. That is, the irregularly randomly fractured magnetic sheet of the related art has low structural reproducibility, and it is therefore difficult to secure consistent magnetic characteristics across devices. Also, the irregularly fractured magnetic sheet promotes chaos (disorder) in lines of magnetic force, and thereby negatively affects efficiency in use as a blocking sheet.

In an example embodiment of the present disclosure, regular fracturing is undertaken using a fracturing tool able to provide regularity, to thus provide the magnetic sheet 100 in which a plurality of cracked portions 110 are formed regularly, thereby solving the aforementioned problem.

The magnetic sheet 100 according to an example embodiment may be manufactured using a fracturing tool having a contact in such a form that stress is concentrated on a particular portion. Thus, the magnetic sheet 100 including a plurality of regularly formed cracked portions 110 according to an example embodiment may secure reproducibility and stability of blocking performance and enhanced charging efficiency.

The plurality of cracked portions 110 are formed in the magnetic sheet 100 (e.g., formed at regular intervals (or even spacing), and formed to have a regular or consistent structure in each cracked portion), and include a plurality of metal ribbon fragments 110a. As described above, when the plurality of cracked portions 110 are regularly formed, the cracked portions 110 have a specific/standard shape, and the plurality of cracked portions are arranged in a regular pattern such as at predetermined even intervals in an orderly manner. Also, as described above, the plurality of cracked portions 110 may be arranged in such a manner that spacings between the centers of adjacent cracked portions 110 are uniform.

The cracked portions 110 include a plurality of metal ribbon fragments 110a, and the plurality of metal ribbon fragments 110a are formed radially, centered on one point. That is, the plurality of metal ribbon fragments 110a in each cracked portion 110 may be formed such that edges of the fragments extend radially from a common center point of the cracked portion 110 to form a single cracked portion 110. About four or more metal ribbon fragments 110a form a single cracked portion 110, and a size of the metal ribbon fragments 110a may be appropriately adjusted according to a size and a shape of the cracked portion 110.

FIGS. 5A through 5D are detailed views illustrating cracked portions according to example embodiments.

Figure 5A:
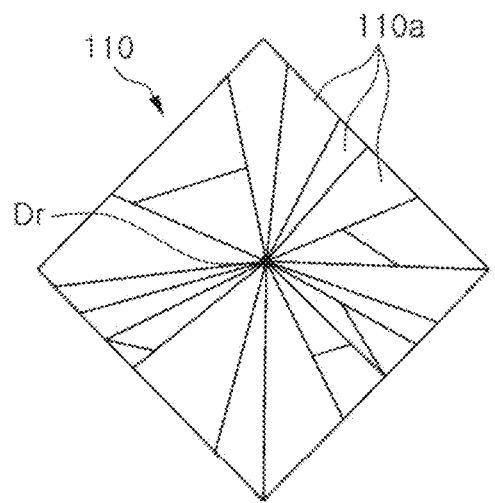
FIGS. 5A through 5D are views illustrating cracked portions according to example embodiments in the present disclosure.
Figure 5B:
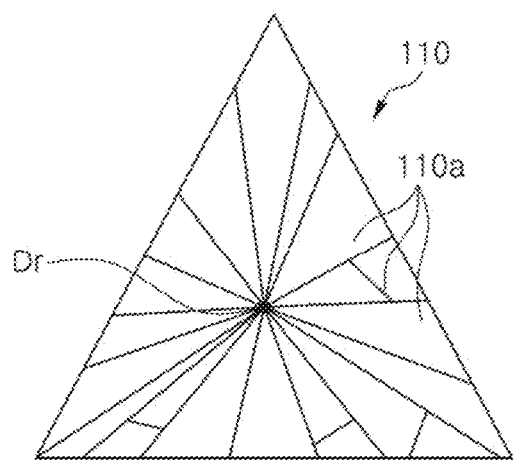
Figure 5C:
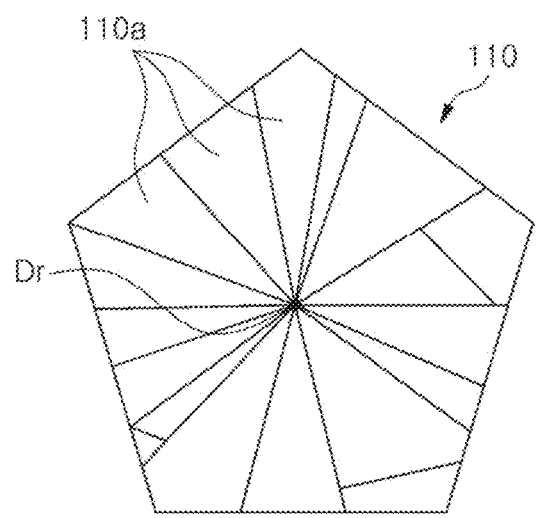
Figure 5D:
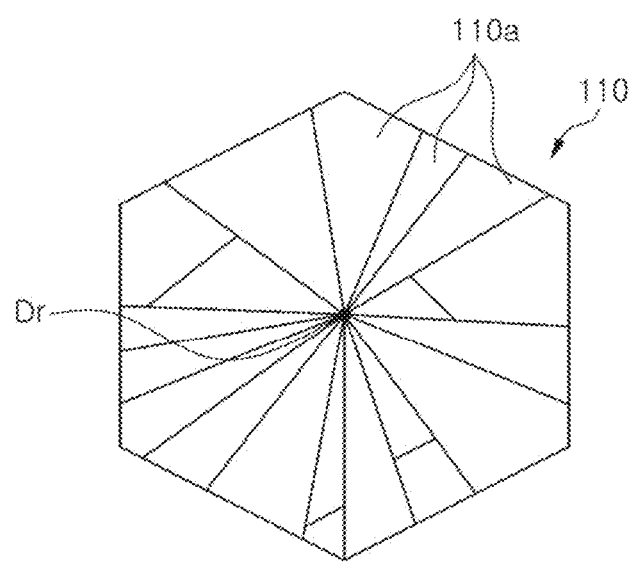

The cracked portion 110 according to an example embodiment may have a shape on the one surface of the magnetic sheet that is one or more selected from the group consisting of triangular (e.g., as shown in FIG. 5B), quadrangular (e.g., as shown in FIG. 5A), pentagonal (e.g., as shown in FIG. 5C), hexagonal (e.g., as shown in FIG. 5D), circular, and dumbbell-like shapes. However, the shape of the cracked portion 110 is not limited thereto, and the cracked portion 110 according to an example embodiment may have any shape as long as it is distinguished to have a specific/predetermined shape (e.g., a same specific/predetermined shape as other cracked portions 110 of a same magnetic sheet 100), unlike a random fracturing shape. The shape of the cracked portion 110 corresponds to the shape of the base of the solid structure in cases in which the cracked portion forms a solid structure extending from the surface of the magnetic sheet. The shape of the cracked portion 110 also corresponds to the shape formed by the ribbon fragments of one cracked portion 110 in the surface of the magnetic sheet 100.

FIG. 5A illustrates a cracked portion 110 having a quadrangular shape according to an example embodiment, FIG. 5B illustrates a cracked portion 110 having a triangular shape according to an example embodiment, FIG. 5C illustrates a cracked portion 110 having an pentagonal shape according to an example embodiment, and FIG. 5D illustrates a cracked portion 110 having a hexagonal shape according to an example embodiment. Also, although not shown, the cracked portion 110 may have a circular shape or a shape similar thereto, in addition to a polygonal shape.

All the cracked portions 110 according to an example embodiments illustrated in FIGS. 5A through 5D include a plurality of metal ribbon fragments 110a radially formed, centered on one point Dr, although they are different in shape.

Figure 6:
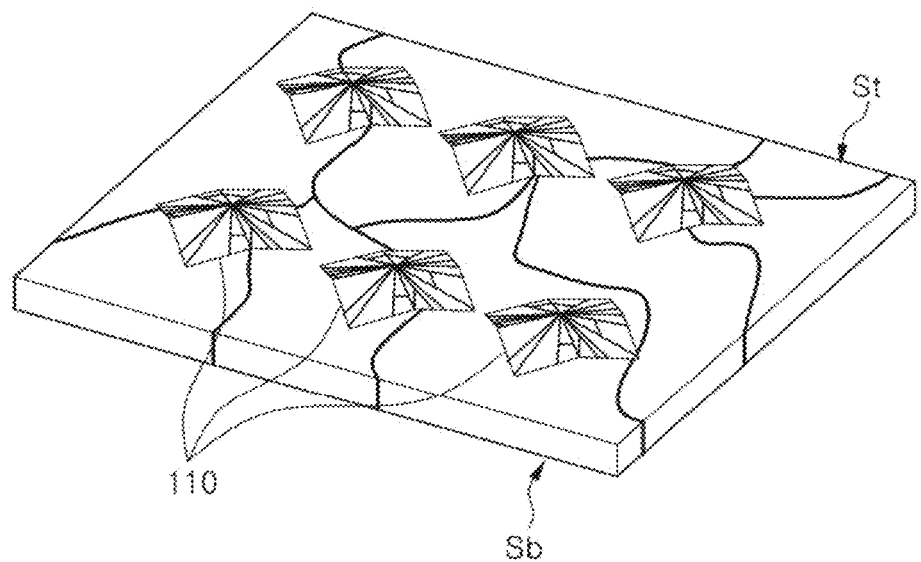
FIG. 6 is a perspective view illustrating a magnetic sheet according to an example embodiment in the present disclosure.

FIG. 6 is a perspective view illustrating a magnetic sheet according to an example embodiment.

Referring to FIG. 6, the cracked portions 110 according to an example embodiment may have a solid structure protruding from one surface St of the magnetic sheet 100. The solid structure of the cracked portions 110 according to an example embodiment may have a substantially pyramidal shape or conical shape with the base side having the aforementioned shape of the cracked portions, and with the base side being on the one surface St of the magnetic sheet 100. As illustrated in FIG. 6, the magnetic sheet 100 may have cracked portions 110 having a pyramidal shape with a quadrangular base side.

That is, the cracked portions 110 according to an example embodiment may have a solid structure in which a plurality of metal ribbon fragments 110a are formed radially, and the plurality of cracked portions 110 are regularly formed on the magnetic sheet 100 according to an example embodiment. Similarly to the previous example embodiment, the regular formation of the cracked portions 110 includes the cracked portions 110 having shapes that are regular/standard and the cracked portions 110 being provided and arranged at regular intervals or spacing. Accordingly, structural reproducibility of the magnetic sheet and stability of shielding performance may be secured, and charging efficiency may be enhanced.

Figure 7A:
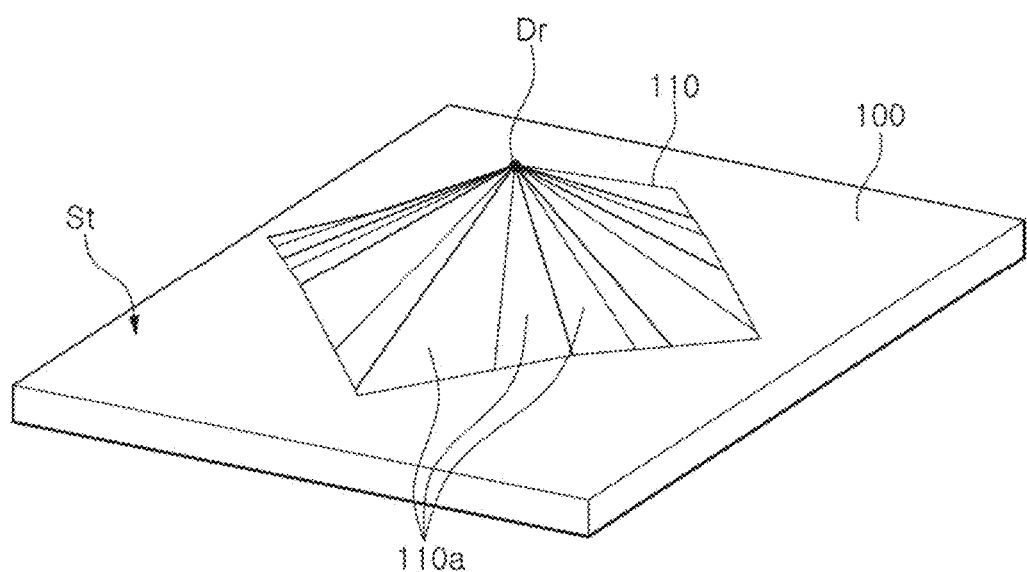
FIG. 7A is an enlarged perspective view of a cracked portion of a magnetic sheet according to an example embodiment in the present disclosure.
Figure 7B:
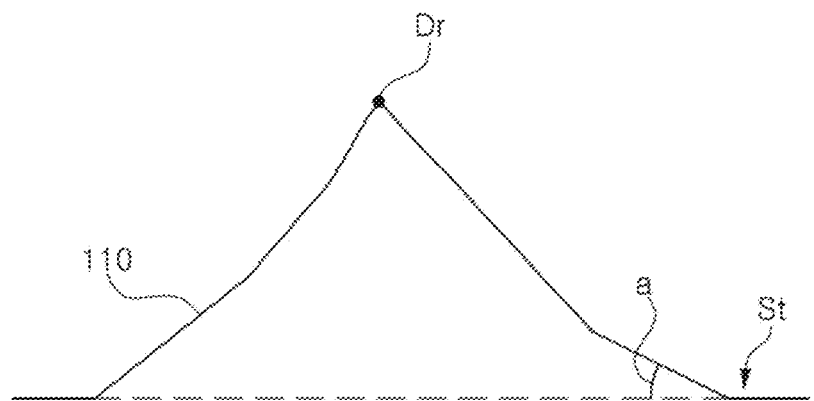
FIG. 7B is a cross-sectional view schematically illustrating a cracked portion according to an example embodiment in the present disclosure.

FIG. 7A is an enlarged perspective view of a cracked portion of a magnetic sheet according to an example embodiment in the present disclosure, and FIG. 7B is a cross-sectional view schematically illustrating slopes of a cracked portion according to an example embodiment in the present disclosure.

Referring to FIG. 7A, the cracked portion 110 according to an example embodiment has a solid structure in which a height thereof from one surface St of the magnetic sheet 100 peaks (or is maximal) at one point Dr and is reduced outwardly therefrom, forming a radial shape.

Here, the cracked portion 110 may have an embossed solid structure extending outwardly from one surface St of the magnetic sheet 100 in a convex manner, and may have an intagliated solid structure extending inwardly in the other surface Sb of the magnetic sheet 100. That is, the cracked portion 110 may protrude from one surface St of the magnetic sheet 100 and be concave from the other surface Sb of the magnetic sheet 100 that is opposite to the one surface St.

FIG. 7B is a surface profile plot of the cracked portion 110 of FIG. 7A. Referring to FIG. 7B, the cracked portion 110 according to an example embodiment is formed in such a manner that a height thereof from the one surface St of the magnetic sheet 100 peaks (or is maximal) at one point Dr and is reduced outwardly from the one point Dr toward the outer side, forming a radial shape, to form an angle of tilt (a) from the one surface St of the magnetic sheet 100.

The cracked portion 110 has a solid structure having an angle of tilt (a) ranging from 0.1° to 20° from one surface St of the magnetic sheet 100. In some examples, the angle of tilt (a) ranges from 1° to 20°, from 5° to 20°, or from 10° to 20° from the one surface St.

When the cracked portion 110 has a solid structure having an angle of tilt (a) ranging from 0.1° to 20° from the one surface St of the magnetic sheet 100, regular structural reproducibility may be enhanced, and magnetic permeability appropriate for application to a blocking sheet may be realized, securing stability of shielding performance and enhancing charging efficiency.

At least one gap is formed between the plurality of metal ribbon fragments 110a included in the cracked portion 110 formed according to an example embodiment. The gap formed between the metal ribbon fragments 110a may be an air gap, for example, and it may greatly affect magnetic characteristics of the magnetic sheet 100. That is, magnetic characteristics of the magnetic sheet 100, such as magnetic permeability, may be adjusted to be different according to a size, a shape, and density of the gap formed between the metal ribbon fragments 110a.

A size of the gap between the metal ribbon fragments 110a may range from 0.1 µm to 20 µm. When the size of the gap between the metal ribbon fragments 110a ranges from 0.1 µm to 20 µm, magnetic permeability appropriate for the various applications of the blocking sheet may be realized, securing stability of shielding performance and enhancing charging efficiency.

The magnetic sheet 100 according to an example embodiment may be manufactured using a fracturing tool having a contact in the form configured to concentrate stress on a specific portion of the magnetic sheet 100. A shape of the contact may have a triangular, quadrangular, pentagonal, or hexagonal shape. However, the shape of the contact is not limited thereto, and the contact may have any shape as long as stress is concentrated on a specific portion within the contact. A degree of effective fracturing may be adjusted by adjusting a space between contacts and a depth and a size of the contacts.

Figure 8:
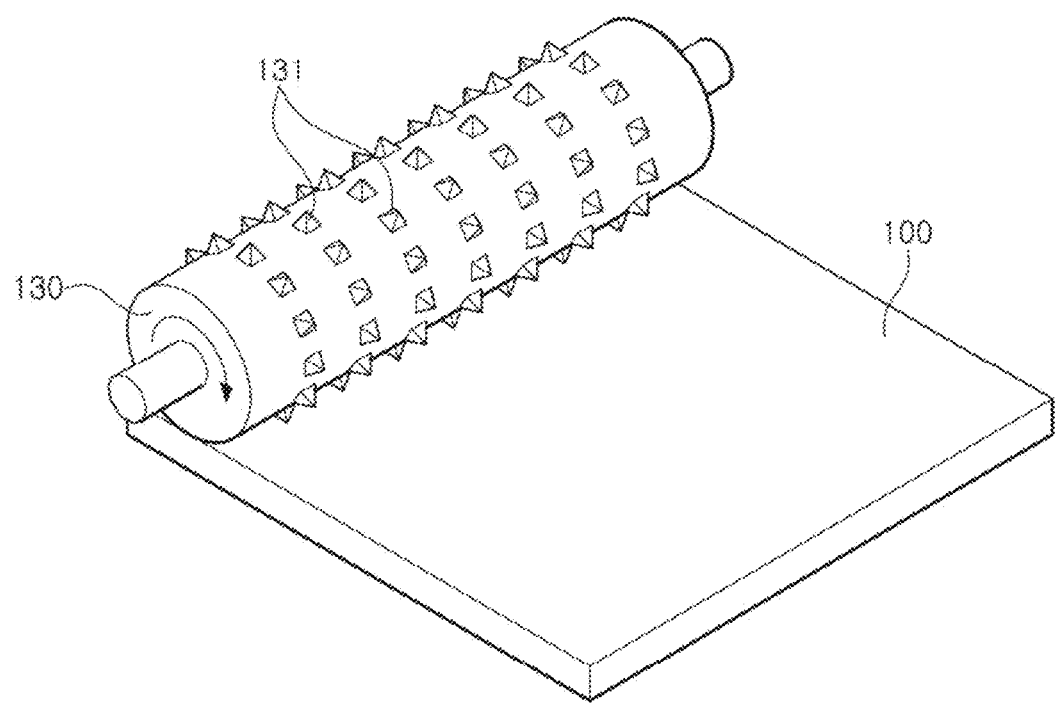
FIG. 8 is a perspective view schematically illustrating a method of manufacturing a magnetic sheet according to an example embodiment in the present disclosure.

This will be described in detail. FIG. 8 is a perspective view schematically illustrating a method of manufacturing a magnetic sheet according to an example embodiment in the present disclosure, in which a cracked portion is formed by applying a roller 130 to a surface of the magnetic sheet 100. The roller 130 is provided for the purpose of forming a cracked portion on the magnetic sheet 100 and has a plurality of protrusions 131 formed on a surface of a rotatable body thereof. In this case, the protrusions 131 may have a pyramidal shape as illustrated in FIG. 8, or may have a conic shape or a polypyramid shape, or further, a columnar shape, rather than the conic shape, as long as it may form a cracked portion having a configuration protruding from the body.

As the roller 130 with the protrusions 131 formed on a surface thereof is rotatably moved, cracked portions corresponding thereto may be formed on the magnetic sheet 100. In this case, in order to form the regular cracked portions as described above, the plurality of protrusions 131 may have a regular shape, and here, the regular shape refer to a case in which shapes of the plurality of protrusions 131, pitches therebetween, and an arrangement form thereof are regular. For example, the plurality of protrusions 131 may be spaced apart from adjacent protrusions and regularly arranged at the same intervals as the spacing d between the cracked portions 110 described above with reference to FIG. 4, and distances between the protrusions 131 may be uniform overall. In this manner, when the magnetic sheet 100 according to an example embodiment is manufactured using a fracture tool causing regular fractures, such as the roller 131 of FIG. 8, a structure of the magnetic sheet 100 may be easily adjusted, facilitating adjustment of magnetic characteristics such as magnetic permeability, or the like, and enhancing structural reproducibility and stability of the magnetic sheet 100.

Figure 12:
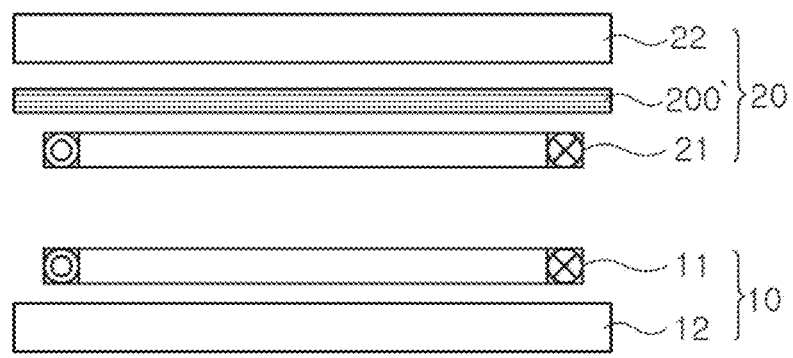
FIG. 12 is a cross-sectional view schematically illustrating a wireless charging system according to an example modified from the example embodiment illustrated in FIG. 3.

The electromagnetic wave blocking sheet 200 for a wireless charging apparatus according to an example embodiment may include the aforementioned magnetic sheet 100 as a monolayer or may include a blocking sheet 200' including multiple layers according to a modified example illustrated in FIG. 12, and the number of magnetic sheets 100 included in the multi-layer sheet 200' may be determined according to desired shielding performance. Also, an adhesive member, a cover film, or a protective film may be further formed on one surface and/or the other surface of the magnetic sheet(s) 100.

Figure 9:
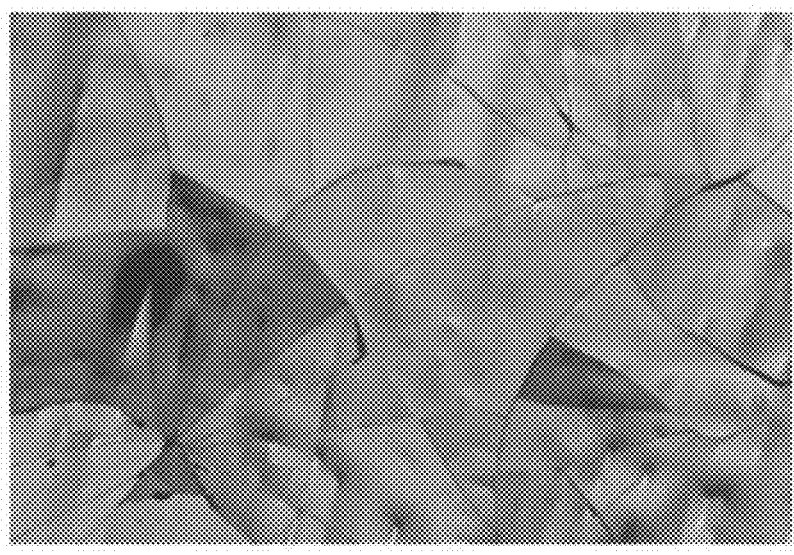
FIG. 9 is an image of a magnetic sheet according to the related art, captured by an optical microscope.
Figure 10:
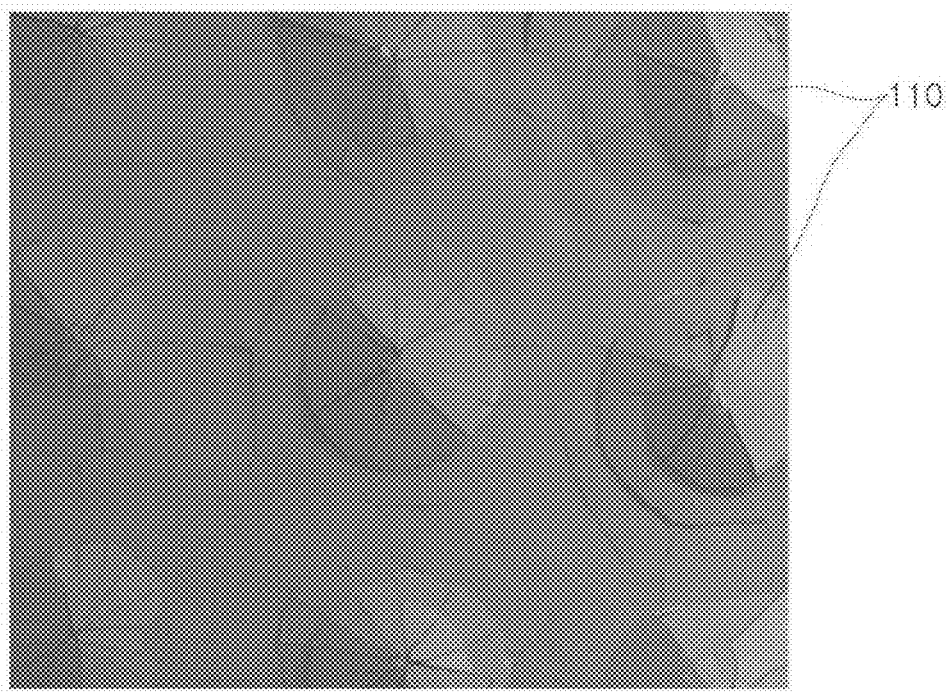
FIG. 10 is a scanning electron microscope (SEM) image of a magnetic sheet according to an example embodiment in the present disclosure.
Figure 11A:
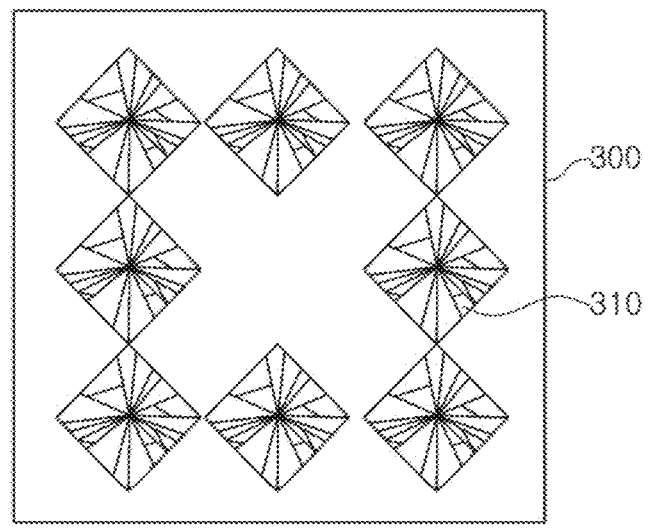
FIGS. 11A through 11D are plan views schematically illustrating a magnetic sheet according to another example embodiment in the present disclosure.
Figure 11B:
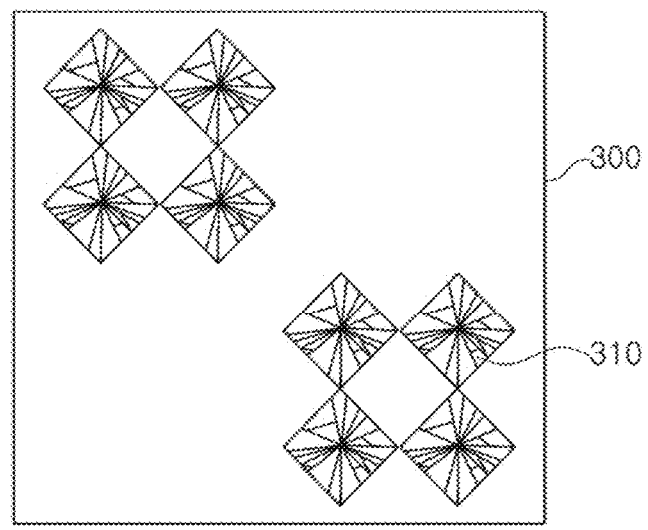
Figure 11C:
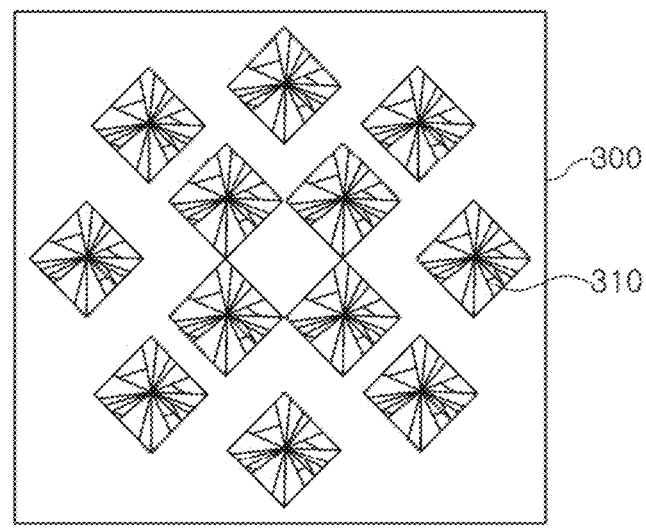
Figure 11D:
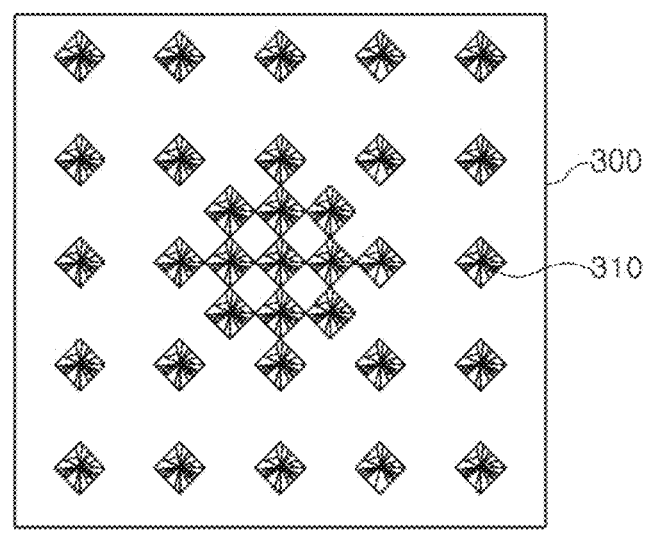

FIG. 9 is an image of a magnetic sheet of a sheet for shielding electromagnetic waves for a wireless charging apparatus according to the related art, captured by an optical microscope, and FIG. 10 is a scanning electron microscope (SEM) image of a magnetic sheet of a sheet for shielding electromagnetic waves for a wireless charging apparatus according to an example embodiment.

First, FIG. 9 shows a magnetic sheet that is irregularly randomly fractured according to the related art. The irregularly fractured magnetic sheet has low structural reproducibility which makes it difficult to adjust magnetic characteristics to optimize charging efficiency.

In contrast, FIG. 10 illustrates a magnetic sheet including a plurality of cracked portions 110 regularly formed according to an Example Embodiment. The magnetic sheet illustrated in FIG. 10 includes the plurality of regularly formed cracked portions 110 having a solid structure, and each cracked portion 110 includes a plurality of metal ribbon fragments 110a formed to extend radially from one central point.

Meanwhile, in the previous example embodiment, the structure in which the cracked portions of the magnetic sheet are arranged at regular intervals has been described, but a regular arrangement is not realized only in that manner described above. For example, as illustrated in the modified example embodiment of FIGS. 11A through 11D, a plurality of cracked portions 310 may be formed to be symmetrical overall in the magnetic sheet 300 and may not be present in a portion of the magnetic sheet 300. In the magnetic sheet 300 having such a configuration, the plurality of cracked portions 310 may be appropriately modified in a form or arrangement thereof according to functions required for the magnetic sheet 300 within a range satisfying regularity.

In order to verify excellent effects of the magnetic sheet having the cracked portions regularly formed according to an example embodiment in the present disclosure, the inventors of the present application compared the magnetic sheet with the related art magnetic sheet. In the case of the example embodiment in the present disclosure, as illustrated in FIG. 4, a metal ribbon magnetic sheet 100 (example embodiment) was manufactured to include a plurality of regularly formed cracked portions 110 each including a plurality of radially formed metal ribbon fragments 110a and having a solid structure. Also, a metal ribbon magnetic sheet (Comparative Example) was manufactured to be irregularly randomly fractured and not to have a solid structure.

The magnetic sheets according to the Embodiment and the Comparative Example were applied as sheets for shielding electromagnetic waves during wireless charging, and wireless charging efficiency was measured. The unexpected results are shown in Table 1.

When the same ribbon magnetic sheets are used, magnetic permeability may be used indirectly as a numerical value indicating a degree of fracturing of metal ribbons, and fracturing was performed by a level at which magnetic permeability (u' @100 kHz=100~1500) is the same as a reference for comparing the Embodiment and Comparative Example.

TABLE 1

|  | Magnetic Permeability (u' @ 100 kHz) | Charge Efficiency (%) |
|---|---|---|
| Example Embodiment | 430-470 | 72.1 |
| Comparative Example | 420-460 | 67.1 |

Referring to Table 1, it can be seen that an application of the metal ribbon magnetic sheet 100 in which a plurality of cracked portions 110 including a plurality of radially formed metal ribbon fragments 110a and having a solid structure are regularly formed according to the example embodiment as a sheet for shielding again electromagnetic waves for a wireless charging apparatus has superior charging efficiency. That is, the irregularly fractured magnetic sheet promotes disorder in lines of magnetic force, negatively affecting efficiency as a blocking sheet, whereas the magnetic sheet 100 according to the example embodiment is regularly fractured, obtaining higher charging efficiency.

In this manner, according to the example embodiment, reproducibility and stability of shielding performance of the sheet for shielding electromagnetic waves for a wireless charging apparatus may be secured through the regular and uniform fracturing. Also, since the structure of the cracked portions of the blocking sheet is easily adjusted by a simple external operation, magnetic permeability may be easily adjusted. In addition, since the lines of magnetic force passing through the blocking sheet are regularly guided through the structure of the blocking sheet with regularity, charging efficiency may be enhanced.

Meanwhile, according to research conducted by the inventors of the present application, in the case of the magnetic sheet having the aforementioned configuration, characteristics thereof were changed according to spacings between the cracked portions, and this is illustrated in Table 2. In detail, wireless charging efficiency, an NFC recognition distance, and a MST recognition rate of the magnetic sheet having the configuration of FIG. 4 were tested, while adjusting the spacing d between mutually adjacent cracked portions 110, and here, the NFC recognition distance was measured as a z-axis recognition distance and the MST recognition rate was measured as a recognition rate within a specific point from a 3 cm distance.

TABLE 2

| Spacing d (um) | Wireless charging efficiency (%) | NFC recognition distance (mm) | MST recognition rate (%) (z = 3 cm) |
|---|---|---|---|
| 25 | x | o | x |
| 50 | o | o | o |
| 100 | o | o | o |
| 200 | o | o | o |
| 300 | o | o | o |
| 500 | o | o | o |
| 600 | o | o | o |
| 1000 | o | o | o |
| 1500 | o | o | o |
| 2000 | o | x | o |
| 3000 | x | x | o |

In Table 2, in regard to the test results, O indicates that target performance was satisfied and X indicates that target performance was not satisfied. Here, as the target performance, wireless charging efficiency was set to 70%, the NFC recognition distance was set to 30 mm, and the MST recognition rate was set to 70% as references in consideration of appropriate efficiency required for a corresponding apparatus and a thickness and a size of a transceiver case.

As can be seen from the test results of Table 2, when the spacing d between the cracked portions of the magnetic sheet ranged from 50 µm to 2000 µm, wireless charging efficiency of 70% or greater was obtained. Also, in the NFC test, it was confirmed that a recognition distance of 30 mm or greater was secured when the spacing d between the cracked portions was 1500 µm or less, and 70% or greater of MST recognition rate was obtained when the spacing d between the cracked portions was 50 µm or greater. Through the test results, it was confirmed that magnetic characteristics may be adjusted according to the purposes of the magnetic sheet by appropriately setting the spacing between the regularly formed cracked portions. In detail, it was confirmed that, when the spacing d between the cracked portions was set to a level of 50 to 1500 µm, an integrated sheet that may be applied to different wireless communications devices (three devices in this test) was manufactured by a single magnetic sheet.

As set forth above, the magnetic sheet according to example embodiments may secure reproducibility and stability of shielding performance and enable enhanced charging efficiency when utilized in a wireless charging apparatus.

While exemplary embodiments have been shown and described above, it will be apparent to those skilled in the art that modifications and variations could be made without departing from the scope of the present invention as defined by the appended claims.

What is claimed is:

1. A sheet for shielding electromagnetic waves, the sheet comprising:
a magnetic sheet formed of a metal ribbon,
wherein the metal ribbon includes a plurality of cracked portions regularly disposed therein in order to control permeability thereof, and
the plurality of cracked portions include a plurality of metal ribbon fragments having a shape extending radially from a common center point of each respective cracked portion.

2. The sheet of claim 1, wherein the plurality of metal ribbon fragments in each of the plurality of cracked portions form a solid structure protruding from one surface of the magnetic sheet.

3. The sheet of claim 2, wherein the plurality of metal ribbon fragments in each of the plurality of cracked portions form a solid structure having an angle of tilt from the one surface of the magnetic sheet ranging from 0.1° to 20°.

4. The sheet of claim 1, wherein the plurality of metal ribbon fragments in each of the plurality of cracked portions form a solid structure in which a height thereof measured from one surface of the magnetic sheet is reduced outwardly from the center point in a radial manner.

5. The sheet of claim 1, wherein the plurality of metal ribbon fragments in each of the plurality of cracked portions form an embossed solid structure extending outwardly from one surface of the magnetic sheet and an intagliated solid structure extending inwardly in another surface of the magnetic sheet opposite to the one surface.

6. The sheet of claim 1, wherein the plurality of metal ribbon fragments in each of the plurality of cracked portions form a shape, on one surface of the magnetic sheet, selected from the group consisting of triangular, quadrangular, pentagonal, hexagonal, circular, and dumbbell-like.

7. The sheet of claim 1, wherein at least one gap is formed between the plurality of metal ribbon fragments in each of the plurality of cracked portions.

8. The sheet of claim 7, wherein a size of the gap ranges from 0.1 µm to 20 µm.

9. A sheet for shielding electromagnetic waves, the sheet comprising:
a magnetic sheet formed of a metal ribbon,
wherein the magnetic sheet includes fractures disposed in a plurality of cracked portions spaced apart from each other in the magnetic sheet, each of the cracked portions extending outwardly, relative to one surface of the magnetic sheet in regions between the spaced apart cracked portions, as a solid structure having a pyramidal shape or a conical shape from the one surface of the magnetic sheet, and wherein the plurality of racked portions include a plurality of metal ribbon fragments having edges extending radially from a common center point.

10. The sheet of claim 9, wherein at least one gap is formed between the plurality of metal ribbon fragments in each of the plurality of cracked portions.

11. The sheet of claim 9, wherein the plurality of cracked portions forms an embossed solid structure extending outwardly from the one surface of the magnetic sheet and an intagliated solid structure extending inwardly of another surface of the magnetic sheet opposite to the one surface.

12. The sheet of claim 9, wherein the cracked portions of the plurality of cracked portions are disposed at regular intervals on the one surface of the magnetic sheet.

13. The sheet of claim 9, wherein the base of the solid structure of each cracked portion has a shape, on the one surface of the magnetic sheet, selected from the group consisting of triangular, quadrangular, pentagonal, hexagonal, circular, and dumbbell-like.

14. A sheet for shielding electromagnetic waves, the sheet comprising:
   a magnetic sheet formed of a metal ribbon,
   wherein the magnetic sheet includes a plurality of cracked portions arranged at regular intervals on one surface of the magnetic sheet, each cracked portion having a solid structure protruding from the one surface of the magnetic sheet relative to the regions between the cracked portions, and wherein the solid structure of each of the plurality of cracked portions includes a plurality of metal ribbon fragments, and the plurality of metal ribbon fragments have edges extending radially from a common center point of each respective cracked portion.

15. The sheet of claim 14, wherein the solid structure of each of the plurality of cracked portions has a height measured from the one surface of the magnetic sheet that is reduced outwardly from the center point in a radial manner.

16. The sheet of claim 14, wherein an angle of tilt of each solid structure from the one surface of the magnetic sheet ranges from 0.1° to 20°.

17. The sheet of claim 14, wherein each solid structure protruding from the one surface of the magnetic sheet has a corresponding intagliated solid structure extending inwardly in another surface of the magnetic sheet opposing the one surface.

18. The sheet of claim 14, wherein a base of each solid structure of the plurality of cracked portions has a shape selected from the group consisting of triangular, quadrangular, pentagonal, hexagonal, circular, and dumbbell-like.

19. The sheet of claim 14, wherein spaces between centers of adjacent cracked portions among the plurality of cracked portions are uniform.

20. A sheet for shielding electromagnetic waves, the sheet comprising:
   a magnetic sheet formed of a metal ribbon,
   wherein the magnetic sheet includes fractures disposed in a plurality of cracked portions,
   the plurality of cracked portions are regularly formed,
   a spacing between adjacent cracked portions ranges from 50 μm to 1500 μm,
   each cracked portion protrudes from the magnetic sheet relative to one surface of the magnetic sheet in regions between the cracked portions the plurality of cracked portions comprise a plurality of metal ribbon fragments, and the plurality of metal ribbon fragments in each of the plurality of cracked portions form a solid structure protruding from one surface of the magnetic sheet.

21. The sheet of claim 20, wherein the plurality of metal ribbon fragments in each of the plurality of cracked portions form a solid structure having an angle of tilt from the one surface of the magnetic sheet ranging from 0.1° to 20°.

22. The sheet of claim 20, wherein the plurality of metal ribbon fragments included in each of the plurality of cracked portions have edges extending radially from a common center point of each respective cracked portion.

23. The sheet of claim 22, wherein the plurality of metal ribbon fragments in each of the plurality of cracked portions form a solid structure in which a height thereof measured from one surface of the magnetic sheet is reduced outwardly from the center point in a radial manner.

24. The sheet of claim 20, wherein the plurality of metal ribbon fragments in each of the plurality of cracked portions form an embossed solid structure extending outwardly from one surface of the magnetic sheet and an intagliated solid structure extending inwardly in another surface of the magnetic sheet opposite to the one surface.

25. The sheet of claim 20, wherein the plurality of metal ribbon fragments in each of the plurality of cracked portions form a shape, on one surface of the magnetic sheet, selected from the group consisting of triangular, quadrangular, pentagonal, hexagonal, circular, and dumbbell-like.

* * * * *